United States Patent
Murakami (10) Patent No.: US 9,441,675 B2
(45) Date of Patent: Sep. 13, 2016

(54) WATER PUMP OF INTERNAL COMBUSTION ENGINE WITH A SLINGER SEALING THE BEARING

(71) Applicant: Hitachi Automotive Systems, Ltd., Hitachinaka-shi (JP)

(72) Inventor: Shingo Murakami, Atsugi (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 464 days.

(21) Appl. No.: 13/651,579

(22) Filed: Oct. 15, 2012

(65) Prior Publication Data

US 2013/0094976 A1   Apr. 18, 2013

(30) Foreign Application Priority Data

Oct. 18, 2011  (JP) ................... 2011-228445

(51) Int. Cl.
  *F16C 33/78*  (2006.01)
  *F04D 29/049*  (2006.01)
  (Continued)

(52) U.S. Cl.
  CPC .............. *F16C 33/7896* (2013.01); *F01P 5/12* (2013.01); *F04D 13/02* (2013.01); *F04D 29/026* (2013.01); *F04D 29/049* (2013.01);
  (Continued)

(58) Field of Classification Search
  CPC .... F04D 29/08; F04D 29/049; F04D 29/106; F04D 29/026; F04D 29/426; F04D 13/03; F04D 2300/11; F04D 2300/121; F04D 2300/431; F16C 33/7896; F16C 2361/62; F01P 5/12

USPC ..................... 417/423.12, 374, 380
  See application file for complete search history.

(56) References Cited

U.S. PATENT DOCUMENTS 8,123,018 B2  2/2012  Matsumoto
8,734,099 B2  5/2014  Takarai
(Continued)

FOREIGN PATENT DOCUMENTS

JP   2005-325867 A   11/2005
JP   2007-187319 A    7/2007
(Continued)

OTHER PUBLICATIONS

Coefficients of Linear Thermal Expansion.*
(Continued)

*Primary Examiner* — Justin Jonaitis
*Assistant Examiner* — Christopher Brunjes
(74) *Attorney, Agent, or Firm* — Crowell & Moring LLP (57) ABSTRACT

A water pump of an internal combustion engine, including a pump housing having a cylindrical portion constructed so as to surround an outer peripheral side of a drive shaft, the cylindrical portion being integrally formed of an aluminum-based metal material, and a stepped portion provided on the outer peripheral side of the cylindrical portion. A bearing is provided having an outer race fixed to a pulley and an inner race made of an iron-based metal material and fixed to an outer periphery of the cylindrical portion. Additionally, a shielding member is provided having an inner peripheral side sandwiched between the inner race and the stepped portion, an outer peripheral side having a plate shape and extending to side of the outer race, and an end-face seal structure portion formed of an elastic material and formed on at least one of opposite surfaces of the sandwiched inner peripheral side.

17 Claims, 5 Drawing Sheets

(51) Int. Cl.
*F04D 29/02* (2006.01)
*F04D 29/42* (2006.01)
*F04D 13/02* (2006.01)
*F01P 5/12* (2006.01)

(52) U.S. Cl.
CPC ........ *F04D 29/426* (2013.01); *F05D 2300/11* (2013.01); *F05D 2300/121* (2013.01); *F05D 2300/431* (2013.01); *F16C 2361/63* (2013.01)

(56) References Cited

U.S. PATENT DOCUMENTS

| | | | | |
|---|---|---|---|---|
| 2003/0156772 | A1* | 8/2003 | Yamashita | F04D 29/049 384/486 |
| 2007/0025844 | A1* | 2/2007 | Yamazaki et al. | 415/182.1 |
| 2009/0014271 | A1* | 1/2009 | Matsumoto | F16D 27/115 192/84.1 |
| 2011/0075958 | A1* | 3/2011 | Yamaguchi | F16C 33/7853 384/484 |
| 2011/0150630 | A1* | 6/2011 | Takarai | F01P 5/12 415/111 |

FOREIGN PATENT DOCUMENTS

| | | |
|---|---|---|
| JP | 2009-19744 A | 1/2009 |
| JP | 2011-127539 A | 6/2011 |

OTHER PUBLICATIONS

Japanese Office Action dated Jul. 29, 2014 (two (2) pages).

* cited by examiner

WATER PUMP OF INTERNAL COMBUSTION ENGINE WITH A SLINGER SEALING THE BEARING

BACKGROUND OF THE INVENTION

The present invention relates to a water pump of an internal combustion engine applied to an automobile, particularly to a water-proof structure of a bearing directly supporting a pulley on an outer peripheral portion of a pump housing of the water pump.

Here, since a water pump directly supporting a pulley through a bearing on an outer peripheral portion of a pump housing is configured such that one end side (pump housing side) of the bearing is directly faced with the outside, rain water and the like can easily intrude therein, and durability of the bearing has been concerned.

Thus, as a bearing water-proof structure in a conventional water pump offered for solution of such a problem, those as described in Japanese Patent Provisional Publication No. 2011-127539 below have been proposed, and in such water pump, a thin-plate shaped shielding member is provided to be sandwiched and fixed between a stepped portion formed on the outer peripheral portion of the pump housing and an inner race of the bearing so that intrusion of rain water and the like from the outside can be suppressed by this shielding member.

SUMMARY OF THE INVENTION

Since a water pump for cooling an internal combustion engine feeds cooling water flowing through the inside of the internal combustion engine, a temperature of the pump housing might be largely different between that at start at a low temperature and that after warming-up of the internal combustion engine.

However, in the conventional water pump, the pump housing is formed of an aluminum-based metal material for the purpose of weight reduction and the like, while the inner race of the bearing in contact with the pump housing is formed of an iron-based metal material having a coefficient of linear expansion different from that of the pump housing, and thus, in the pump housing having gone through expansion/contraction by heat of the internal combustion engine, the shielding member cannot be appropriately secured upon being sandwiched, at a low temperature, and therefore rain water and the like might intrude from the inner periphery side of the shielding member.

The present invention has been made in view of the circumstances of the conventional water pump of the internal combustion engine and has an object to provide a water pump of an internal combustion engine that can suppress intrusion of moisture and the like from the inner periphery side of the shielding member despite the temperature change of the pump housing.

The present invention is a water pump of an internal combustion engine provided with a shielding member sandwiched and fixed between a stepped portion constructed on an outer peripheral portion of a pump housing formed of an aluminum-based metal material and an inner race of a bearing formed of an iron-based metal material and fitted on the outer periphery of a cylindrical portion of the pump housing formed in a reduced diameter state through the stepped portion, in which an end-face seal structure portion made of an elastic material is provided on at least one of the opposite surfaces of the sandwiched shielding member.

A first aspect of the present invention resides in a water pump of an internal combustion engine, comprising: a driving device including a pulley rotating by transmission of power from a driving source, a drive shaft rotating together with the pulley, and an impeller provided on the drive shaft to rotate together with the drive shaft; a pump housing including a pump chamber structure portion defining at least a part of a pump chamber in which the impeller is disposed, a cylindrical portion constructed so as to surround an outer peripheral side of the drive shaft, the pump chamber structure portion and the cylindrical portion being integrally formed of an aluminum-based metal material, and a stepped portion provided on the outer peripheral side of the cylindrical portion; a bearing including an outer race fixed to the pulley, an inner race made of an iron-based metal material and fixed to an outer periphery of the cylindrical portion, and a rolling body interposed between the inner race and the outer race; and a shielding member having an inner peripheral side sandwiched and fixed between the inner race and the stepped portion, an outer peripheral side having a plate shape and extending to side of the outer race, and an end-face seal structure portion formed of an elastic material and formed on at least one of opposite surfaces of the sandwiched inner peripheral side.

A second aspect of the present invention resides in a water pump of an internal combustion engine, comprising: a driving device including a pulley rotating by transmission of power from a driving source, a drive shaft rotating together with the pulley, and an impeller provided on the drive shaft to rotate together with the drive shaft; a pump housing including a pump chamber structure portion defining at least a part of a pump chamber in which the impeller is disposed, a cylindrical portion constructed so as to surround an outer peripheral side of the drive shaft, the pump chamber structure portion and the cylindrical portion being integrally formed with each other, and a stepped portion provided on the outer peripheral side of the cylindrical portion; a bearing including an outer race fixed to the pulley, an inner race fixed to an outer periphery of the cylindrical portion and made of a material having a coefficient of linear expansion smaller than the material of the pump housing, and a rolling body interposed between the inner race and the outer race; and a shielding member having an inner peripheral side sandwiched and fixed between the inner race and the stepped portion, and an outer peripheral side having a plate shape and extending to side of the outer race, in which at least one of opposite surfaces of the sandwiched inner peripheral side is coated with an elastic material.

A third aspect of the present invention resides in a water pump of an internal combustion engine, comprising: a driving device including a pulley rotating by transmission of power from a driving source, a drive shaft rotating together with the pulley, and an impeller provided on the drive shaft to rotate together with the drive shaft; a pump housing including a pump chamber structure portion defining at least a part of a pump chamber in which the impeller is disposed, a cylindrical portion constructed so as to surround an outer peripheral side of the drive shaft, the pump chamber structure portion and the cylindrical portion being integrally formed of an aluminum-based metal material, and a stepped portion provided on the outer peripheral side of the cylindrical portion; a bearing including an outer race fixed to the pulley, an inner race made of an iron-based metal material and fixed to an outer periphery of the cylindrical portion, and a rolling body interposed between the inner race and the outer race; and a shielding member having an inner peripheral side sandwiched and fixed between the inner race and the stepped portion, and an outer peripheral side having a plate shape and extending to side of the outer race; wherein an elastic body is interposed between at least one of opposite surfaces of the sandwiched inner peripheral side of the shielding member and at least one of the inner race of the bearing and the stepped portion of the pump housing.

The other objects and features of this invention will become understood from the following description with reference to the accompanying drawings.

BRIEF DESCRIPTION OF THE DRAWINGS

In the drawings, like reference numerals designate like parts and elements throughout all figures, in which.

DETAILED DESCRIPTION OF THE INVENTION

Referring not to FIGS. 1 to 4, a first embodiment of a water pump of an internal combustion engine according to the present invention will be discussed below. In the following embodiment, the water pump of the internal combustion engine according to the present invention is applied to a cooling device of an engine for an automobile similar to conventional ones, and this water pump is arranged on a side face of an engine block and circulates cooling water through the engine block by using a rotational driving force of a crank shaft of the engine as a power source.

Figure 1:
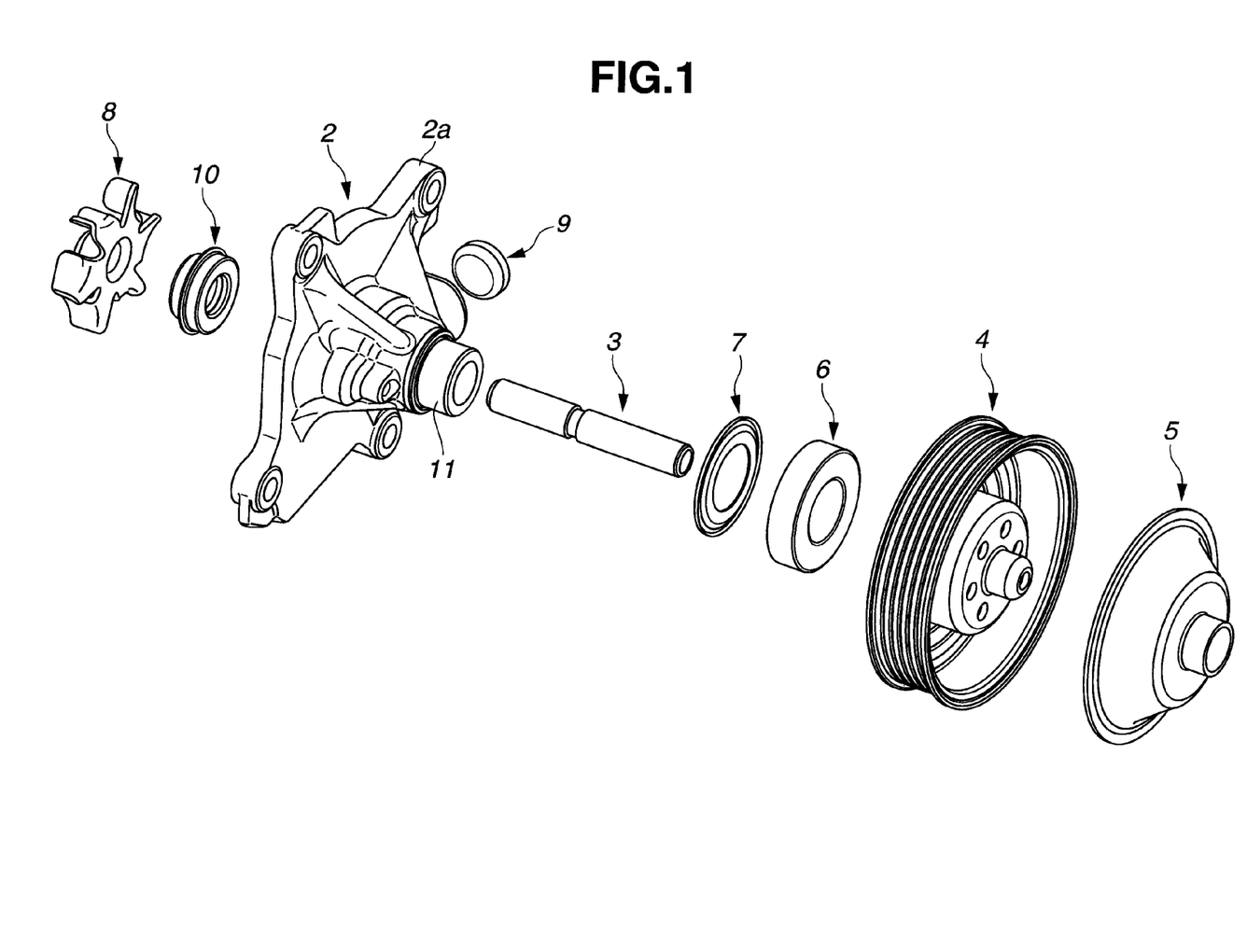
FIG. 1 is an exploded perspective view of a water pump according to the present invention.
Figure 2:
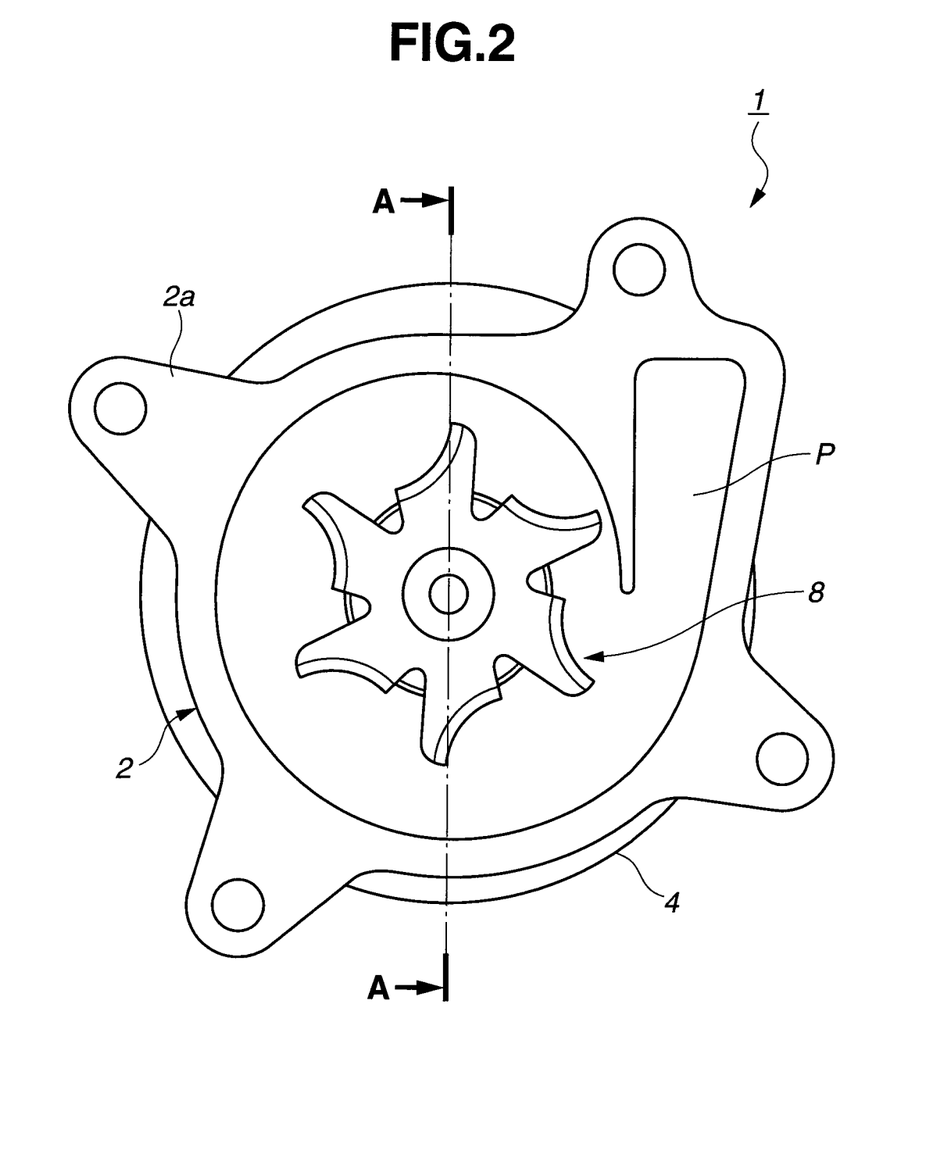
FIG. 2 is a front view of the water pump of the water pump shown in FIG. 1.
Figure 3:
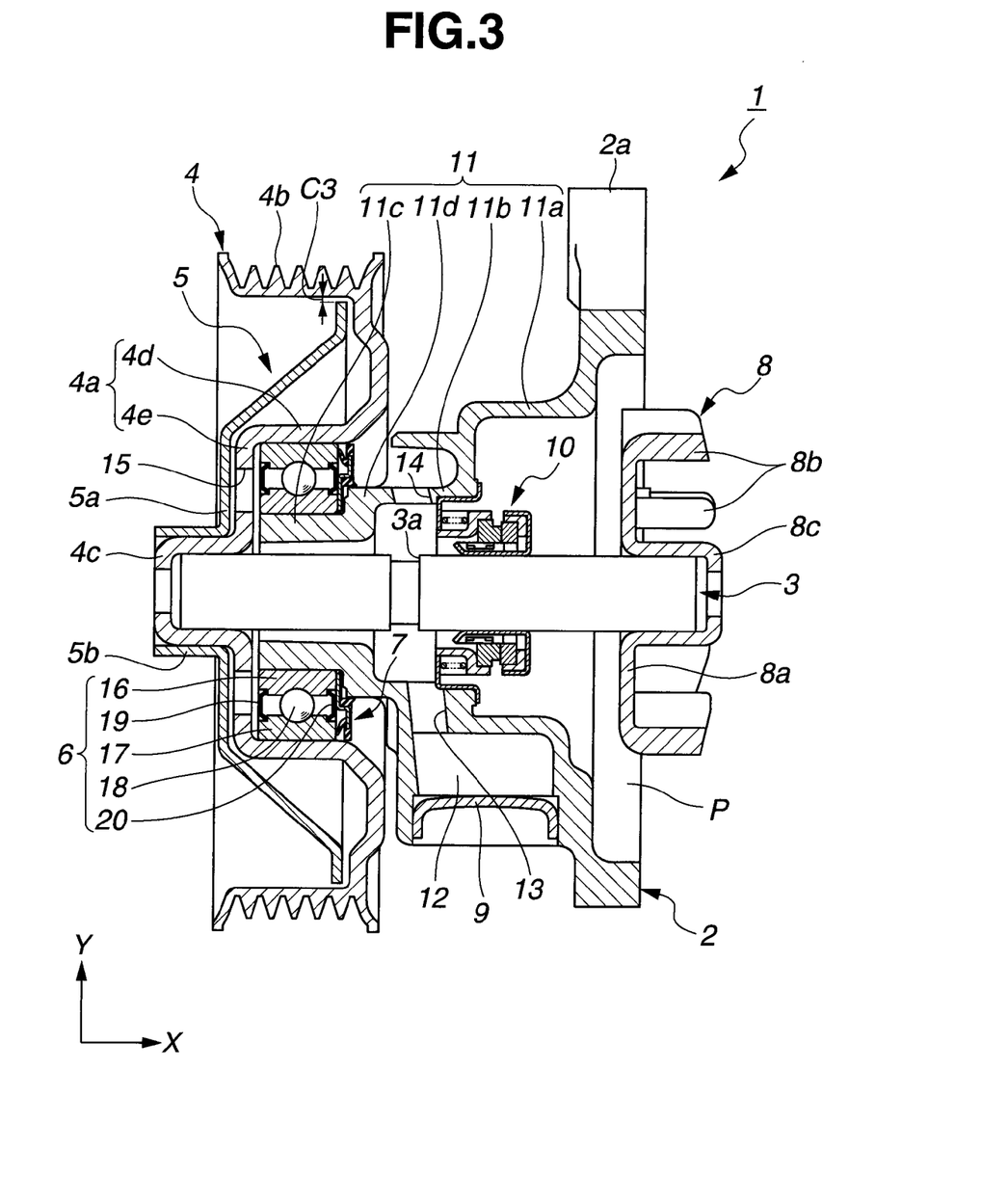
FIG. 3 is a sectional view taken substantially along the line A-A of FIG. 2, illustrating a first embodiment of the present invention.

That is, this water pump 1 has, as illustrated in FIGS. 1 to 3, a pump housing 2 having a cylindrical portion 11 formed in a stepped reduced-diameter state on one end side in its axial direction and defining a pump chamber P between itself and an engine block by being fixed to a side face of the engine block, not shown, through a flange portion 2a (corresponding to a pump chamber structure portion according to the present invention) provided on the other end side. A drive shaft 3 is inserted and arranged in axial direction on the inner peripheral side of pump housing 2 (cylindrical portion 11). A pulley 4 is fixed to an outer periphery on one end portion of drive shaft 3 faced with the outside from one end side of pump housing 2 and transmitting a rotational driving force of a crank shaft through a belt, not shown, to drive shaft 3. A cover member 5 is fixed and arranged on an outer side end portion of pulley 4 and covering substantially the whole of the outer side face of this pulley 4. A bearing 6 is interposed between the one end portion of pump housing 2 and pulley 4 and rotatably supporting pulley 4. A slinger 7 (corresponding to a shielding member according to the present invention) is adjacently arranged so as to oppose the inner side face of the bearing 6 exposed to the outside and suppresses intrusion of foreign substances such as moisture into the inside of bearing 6. Additionally, an impeller 8 is fixed to an outer periphery on the other end side of drive shaft 3 faced with the inside of pump chamber P from the other end side of pump housing 2 and rotatably accommodated in pump chamber P.

Pump housing 2 is integrally formed of an aluminum alloy material and produced by casting (aluminum die-casting). Cylindrical portion 11 has a large diameter portion 11a provided adjacently to flange portion 2a, a medium diameter portion 11b connected to large diameter portion 11a and formed in an intermediate portion in the axial direction of cylindrical portion 11, and a small diameter portion 11c provided in a stepped reduced-diameter state on medium diameter portion 11b through a stepped portion 11d. Below medium diameter portion 11b, a drain chamber 12 defined by being sealed with a plug member 9 on a lower end thereof and communicating with the inside of medium diameter portion 11b through a drain hole 13 which will be described later is provided.

In medium diameter portion 11b, a known mechanical seal 10 is interposed between an end-portion inner peripheral surface on large diameter portion 11a side and an outer peripheral surface of drive shaft 3 opposing that, and intrusion of cooling water from pump chamber P side is suppressed by mechanical seal 10. However, since intrusion of cooling water from pump chamber P side cannot be fully suppressed only by this mechanical seal 10, drain hole 13 communicating with an internal space of medium diameter portion 11b and drain chamber 12 is penetrated and formed in the Y-axis direction in FIG. 3 at a vertically lowest position of a peripheral wall of medium diameter portion 11b, so that the cooling water that could not be fully suppressed by mechanical seal 10 but having flowed into medium diameter portion 11b is discharged into drain chamber 12 by a drain hole 13, and thus the cooling water is prevented from flowing out to small diameter portion 11c side. Moreover, in the peripheral wall of this medium diameter portion 11b, a communication hole 14 communicating with the inside and out of medium diameter portion 11b (pump housing 2) is penetrated and formed in the Y-axis direction in FIG. 3 at a position opposite to drain hole 13 so as to open toward the upper side in the vertical direction, so that the cooling water evaporated in drain chamber 12 can be efficiently discharged through communication hole 14 to the outside.

Drive shaft 3 is formed of a steel material and configured such that one end portion thereof is faced with the outside from one end of pump housing 2, while the other end portion thereof is faced with the outside from the other end of pump housing 2. Moreover, in this drive shaft 3, an annular notch groove 3a having a certain width in the axial direction is provided in the peripheral direction at an axial position closer to the one end side than a fitting position of mechanical seal 10 and corresponding to drain hole 13 and communication hole 14. By providing such notch groove 3a, cooling water transmitted and flowing on an outer peripheral surface of drive shaft 3 in the cooling water flowing over mechanical seal 10 into medium diameter portion 11b can be blocked by notch groove 3a. That is, if cooling water transmitted and flowing on the outer peripheral surface of drive shaft 3 from pump chamber P side flows into notch groove 3a, this cooling water is blocked by the stepped portion on pulley 4 side in notch groove 3a, and its flowing from notch groove 3a to pulley 4 side is suppressed.

Pulley 4 is integrally molded having a generally cylindrical shape by press working of a steel plate and has a cylindrical base portion 4a which is a first cylindrical portion configured having a bottomed cylindrical shape so as to surround small diameter porting 11c of pump housing 2, a belt winding portion 4b which is a second cylindrical portion extended to the outer peripheral side of cylindrical base portion 4a and used to link with the crank shaft by winding the belt around the outer periphery, and a shaft fixing portion 4c formed to be depressed in the axial direction at the center part of cylindrical base portion 4a outward from pump housing 2 side and used for fixation with drive shaft 3. Shaft fixing portion 4c is fixed to drive shaft 3 by being pressed into one-end portion outer periphery of drive shaft 3. Here, cylindrical base portion 4a is composed of a bearing support portion 4d fitted on the outer periphery of bearing 6 and used for rotational support by bearing 6 and an end wall portion 4e extended from an outer end edge of bearing support portion 4d inward in the radial direction and arranged oppositely to the outer side face of bearing 6 and connecting this bearing support portion 4d and shaft fixing portion 4c. After bearing 6 (outer race 17) is press-fitted into an inner periphery of bearing support portion 4d, bearing 6 (inner race 16) is press-fitted on the outer periphery of small diameter portion 11c of pump housing 2, thereby assembling bearing 6 with pump housing 2.

Moreover, in end wall portion 4e of pulley 4, a plurality of discharge holes 15 used for discharge of cooling water having flowed over mechanical seal 10 into small diameter portion 11c from pump chamber P side as described above are formed piercing in the X-axis direction in FIG. 3 and located at substantially equal intervals in the peripheral direction. At least a part of each of these discharge holes 15 is configured to be opened closer to the outer peripheral side than a contact portion between a first bearing seal 19 provided at least partially on bearing 6 and inner race 16 so that the cooling water flowing into small diameter portion 11c is discharged as water vapor to the outside through each of discharge holes 15 before reaching first bearing seal 19. Moreover, each of discharge holes 15 is provided at a position in the radial direction opposing inner race 16 of bearing 6 so that a jig, not shown, can be inserted through each of discharge holes 15 and is also used in a press-fit work of inner race 16 into small diameter portion 11c.

Cover member 5 is press-molded having a generally cylindrical shape and formed of a certain metal material having corrosion resistance such as aluminum alloy and stainless steel. Cover member 5 is composed of a covering portion 5a covering cylindrical base portion 4a of pulley 4 from the outside and a fixed portion 5b projecting having a cylindrical shape in the axial direction at the center part of covering portion 5a and used for fixation with pulley 4. Cover member 5 is fixed to pulley 4 by press-fitting portion 5b on an outer periphery of shaft fixing portion 4c of pulley 4. This cover member 5 is brought into contact with shaft fixing portion 4c of pulley 4 at an inner peripheral edge thereof as described above, while an outer peripheral edge extends to a position close to an inner peripheral surface of belt winding portion 4b of pulley 4 and is configured to cover substantially the whole of the outer side face of pulley 4 so that problem that a foreign substance such as rain water and the like directly reaches bearing 6 from the outside through each of discharge holes 15 can be solved.

Bearing 6 is a so-called single-row ball bearing with seal and is interposed between the outer peripheral surface of small diameter portion 11c and the inner peripheral surface of bearing support portion 4d, and composed of inner race 16 press-fitted on and fixed to the outer peripheral surface of small diameter portion 11c, outer race 17 press-fitted on and fixed to the inner peripheral surface of bearing support portion 4d, and a plurality of balls 18 as rolling elements held by a pair of holding grooves provided opposing each other and formed respectively in inner and outer races 16 and 17. Annular first and second bearing seals 19 and 20 are respectively fixed to the opposite end portions of bearing 6 to interrupt communication between a cylindrical space portion defined between inner and outer races 16 and 17 and the outside. Each of first and second bearing seals 21 and 22 is caulked and fixed at its inner peripheral portion to the inner peripheral edge of the end portion of inner race 16, and also fixed at its outer peripheral portion to the inner peripheral edge of the end portion of the outer race 17. Grease as a lubricant oil, not shown, is filled inside the cylindrical space portion of bearing 6 so as to promote lubrication, anti-rusting and the like. In such bearing 6, intrusion into bearing 6 of moisture flowing into small diameter portion 11c from medium diameter portion 11b is suppressed by first bearing seal 19 disposed on one end portion in the axial direction thereof, while intrusion of foreign substances such as moisture into bearing 6 from the outside and the like is suppressed by second bearing seal 20 and slinger 7 disposed adjacently thereto.

Figure 4:
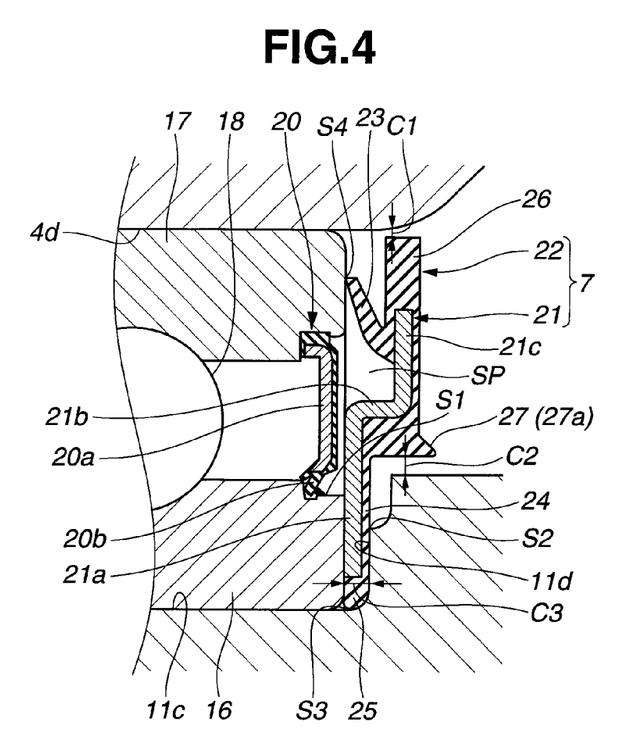
FIG. 4 is a fragmentary enlarged view showing an essential part of the water pump in FIG. 2, according to the first embodiment.

Here, since first and second bearing seals 19 and 20 are configured having the same structure, detailed configuration will be described only for second bearing seal 20 for convenience. This second bearing seal 20 is, particularly as illustrated in FIG. 4, mainly composed of a core metal 20a embedded in a rubber material on the outer peripheral end portion (base end portion) thereof, and a seal lip 20b provided capable of elastic deformation on the inner peripheral end portion (distal end portion) thereof, so that the intrusion of foreign substances into bearing 6 is suppressed by a first seal portion S1 configured by elastic contact (sliding contact) between seal lip 20b and the inner peripheral side end edge of the other end portion (end portion opposite to slinger 7) of inner race 16.

Slinger 7 is made of a slinger main body 21 formed of a certain metal material having an annular and thin-plate shape capable of elastic deformation and a seal structure portion 22 integrally molded with slinger main body 21 so as to cover the inner side portion and inner and outer peripheral portions of slinger main body 21 and sealing a space between both members 2 and 6 in a liquid-tight manner when being brought into close contact with pump housing 2 and bearing 6. The inner peripheral portion of slinger 7 is fitted and fixed to the outer peripheral surface of small diameter portion 11c with a certain tightening margin through an inner peripheral surface seal structure portion 25 which will be described later, while the outer peripheral portion is set so that a gap C1 in the radial direction formed between both 4d and 7 is made as small as possible by extending an outer peripheral surface seal structure portion 25 which will be described later to a position close to the inner peripheral surface of bearing support portion 4d. As such, by arranging slinger 7 so as to close an exposed opening portion of bearing 6 which becomes an intrusion path for rain water and the like directly flowing in from the outside and cooling water discharged through communication hole 14, inconvenience that the moisture such as rain water directly reaches bearing 6 can be suppressed.

Slinger main body 21 is formed by bending a thin-plate shape metal plate in a stepped state and is composed of a substantially flat inner peripheral portion 21a sandwiched and fixed between stepped portion 11d of pump housing 2 and inner race 16 of bearing 6, a bent portion 21b formed by being bent in a stepped shape so as to become a crank shape in cross-section, on the outer peripheral side of inner peripheral portion 21a, and an outer peripheral portion 21c composed having a substantially flat shape on the outer peripheral side of bent portion 21b and provided in an offset manner so as to separate from the inner side face of bearing 6 by this bent portion 21b. Inner peripheral portion 21a has its inner side face in pressure contact with stepped portion 11d (more specifically, an annular surface of the stepped portion, coaxial with drive shaft 3 and perpendicular to the axis of the drive shaft) through an end-face seal structure portion 24 which will be described later and its outer side face in direct pressure contact with inner race 16 so as to be sandwiched between both 11d and 16.

Seal structure portion 22 is made of an elastic material such as synthetic rubber and the like, for example, and is composed of end-face seal structure portion 24 provided so as to cover the entire inner side face of slinger main body 21 and constituting a second seal portion S2 for sealing a space between the inner side face of slinger main body 21 (slinger 7) and the end face of stepped portion 11d in a liquid-tight manner, inner peripheral surface seal structure portion 25 provided along the inner peripheral surface of slinger main body 21 and constituting a third seal portion S3 for sealing a space between the inner peripheral surface of the slinger main body 21 (slinger 7) and the outer peripheral surface of small diameter portion 11c in a liquid-tight manner, and outer peripheral surface seal structure portion 25 provided so as to cover the vicinity of the outer peripheral portion of slinger main body 21 along the outer peripheral surface of slinger main body 21 and constituting a fourth seal portion S4 for particularly sealing a space between the outer side surface of slinger main body 21 (slinger 7) and the inner end face of the outer race 17 particularly through the seal lip 23 extended to the outer side portion thereof in a liquid-tight manner, in which each of these seal structure portions 24 to 26 are integrally molded so as to be continuous.

In more detail, end-face seal structure portion 24 is interposed between stepped portion 11d and slinger main body 21 in a sufficiently compression-deformed (elastic deformation) state by a pressing force from inner race 16. In other words, this end-face seal structure portion 24 is designed (material, thickness, width and the like, for example) so as to make an elastic deformation larger than a difference in a contraction amount on the basis of a difference in a coefficient of linear expansion between inner race 16 and pump housing 2 (stepped portion 11d) and is configured so that a gap in the axial direction is not generated between that and stepped portion 11d even after pump housing 2 is subjected to thermal expansion/contraction.

Moreover, on end-face seal structure portion 24, an annular projection 27 extending along the outer peripheral surface of medium diameter portion 11b is provided at a portion close to the outer peripheral surface of medium diameter portion 11b close to the position in the radial direction of bent portion 21b. That is, by means of this annular projection 27, intrusion of rain water and the like into a gap C2 in the radial direction formed between the slinger 7 and the outer peripheral surface of medium diameter portion 11b can be suppressed, and as a result, rain water and the like acting on the second and third seal portions S2 and S3 are limited, and waterproofness by the second and third seal portions S2 and S3 is improved. Moreover, this annular projection 27 is formed having an outer peripheral surface which is frusto-conical and tapered so that the diameter of the outer peripheral surface gradually reduces toward the tip end side, and rain water and the like acting on the inner side face of slinger 7 from the outside can be led toward communication hole 14 side by means of such a tapered portion 27a. As a result, intrusion of rain water and the like into the gap C2 in the radial direction can be effectively suppressed.

Moreover, the inner peripheral surface seal structure portion 25 is disposed to small diameter portion 11c with a sufficient tightening margin so that its state in close contact with the outer peripheral surface of small diameter portion 11c is maintained even after pump housing 2 is subjected to thermal expansion/contraction, and therefore movement in the radial direction of slinger 7 does not occur. Furthermore, outer peripheral surface seal structure portion 25 is configured to be such that the gap C1 in the radial direction is minimized and the tip end portion of seal lip 23 is in elastic contact (sliding contact) with the inner end face of outer race 17 all the time.

By configuring as above, a waterproofing action by second to fourth seal portions S2 to S4 constituted by the seal structure portions 24 to 26, respectively, can be stably exerted all the time even while the pump is driving. Then, intrusion of rain water and the like into bearing 6 is suppressed as much as possible by double to triple seal structures constituted by the second to fourth seal portions S2 to S4 and the first seal portion S1 (a double structure on the outer peripheral side by the first seal portion S1 and the fourth seal portion S4 and a triple structure on the inner peripheral side by the first to third seal portions S1 to S3).

Impeller 8 is integrally formed by press working of a steel plate as illustrated in FIGS. 1 to 3 and has a base portion 8a formed having a substantially disk shape, a plurality of vane portions 8b, each being formed by cutting and raising the outer peripheral side at certain locations in the circumferential direction of base portion 8a and bent in the axial direction, and a cylindrical shaft portion 8c depressed and formed at the center part of base portion 8a in the axial direction from pump housing 2 side to the engine block side, and shaft portion 8c is fixed to drive shaft 3 by press-fitting shaft portion 8c onto the outer periphery on the other end portion of drive shaft 3.

By configuring as above, according to water pump 1 of the internal combustion engine according to this embodiment, since slinger 7 is sandwiched and fixed such that end-face seal structure portion 24 is sufficiently compression-deformed, even if the interval C3 in the axial direction between stepped portion 11d which is a sandwiched portion of slinger 7 and inner race 16 is increased on the basis of the difference in the coefficient of linear expansion between pump housing 2 and bearing 6 (inner race 16), the increase of the interval C3 in the axial direction can be absorbed by elasticity (recovering deformation) of the end-face seal structure portion 24. As a result, even if the interval C3 in the axial direction of the sandwiched portion is increased on the basis of the difference in the coefficient of linear expansion, each side portion of slinger 7 can be held in close contact with the end face of stepped portion 11d and the inner end face of inner race 16, respectively, and the moisture intrusion from the inner peripheral side of the slinger 7 can be suppressed.

Moreover, in this embodiment, since inner peripheral surface seal structure portion 25 is provided in addition to and adjacently to end-face seal structure portion 24, even if the rain water and the like should pass the second seal portion S2, intrusion of the rain water and the like having passed through the second seal portion S2 can be suppressed by the third seal portion S3 constituted by inner peripheral surface seal structure portion 25.

Furthermore, since slinger 7 is brought into close contact with the outer peripheral surface of small diameter portion 11c by elasticity of inner peripheral surface seal structure portion 25 in addition to the above-described double sealing action, movement of slinger 7 (particularly, the movement in the radial direction) can be also suppressed. As a result, the gap C1 in the radial direction is maintained to a certain minimum gap, and a labyrinth effect realized by slinger 7 including the gap C1 in the radial direction can be improved.

In addition, since inner peripheral surface seal structure portion 25 is provided integrally with and continuously to end-face seal structure portion 24 on the end portion of pump housing 2 side in slinger 7, formability of slinger 7 is made favorable so that a manufacturing cost is reduced, and a large sealing area by seal structure portion 22 can be obtained from the end face of stepped portion 11d to the outer peripheral surface of small diameter portion 11c, so that the sealing effect by means of seal structure portion 22 can be further improved.

Moreover, in the case of this embodiment, fluidity of moisture such as rain water having intruded from the gap C1 in the radial direction to bearing 6 side can be suppressed by seal lip 23 of slinger 7, and moisture in the vicinity of the fourth seal portion S4 can be evaporated and removed by friction heat generated by sliding contact of seal lip 23 with outer race 17 rotating with pump driving. As a result, inconvenience such as breakage of bearing 6 and the like caused by intrusion of the moisture into bearing 6 can be suppressed as much as possible.

Furthermore, since this seal lip 23 is provided continuously to and integrally with end-face seal structure portion 24 on the end portion on pump housing 2 side in slinger 7, a manufacturing cost of slinger 7 can be also reduced by improvement in formability of slinger 7 similarly to the case of inner peripheral surface seal structure portion 25.

Moreover, in water pump 1, since a corner portion formed between small diameter portion 11c and stepped portion 11d is configured to be connected by a curved surface in which the outer peripheral surface of small diameter portion 11c and the end face of stepped portion 11d form a continuous arc-shaped cross-section, seal structure portion 22 (inner peripheral surface seal structure portion 25 and end-face seal structure portion 24) is brought into close contact with the arc-shaped corner portion from the outer peripheral surface of small diameter portion 11c to the end face of stepped portion 11d, so that the sealing effect by means of seal structure portion 22 can be further improved.

Furthermore, in this embodiment, since the configuration is such that end-face seal structure portion 24 is not provided on the inner peripheral side from seal lip 23 on the outer side face of slinger 7, slinger main body 21 made of a metal material can be brought into close contact with inner race 16 similarly made of a metal material. As a result, mounting rigidity of slinger 7 can be improved as compared with provision of end-face seal structure portion 24 also on the inner peripheral side portion of seal lip 23. As a result, sufficient compression (elastic) deformation of end-face seal structure portion 24 relating the inner side face of slinger 7 and favorable absorption of an increase of the interval C3 in the axial direction by end-face seal structure portion 24 on the basis of the compression deformation are improved.

Figure 5:
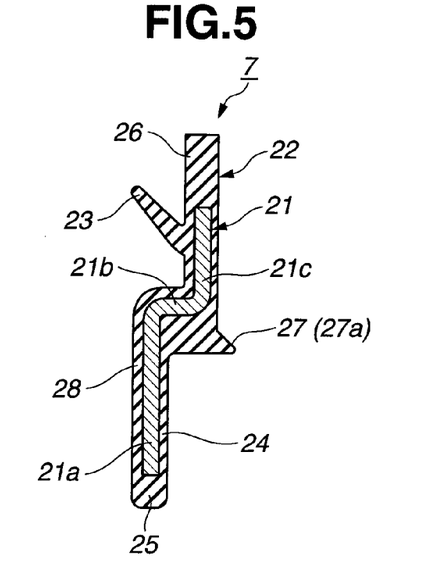
FIG. 5 is a longitudinal sectional view of a slinger (single body) of the water pump according to a second embodiment of the present invention.

FIG. 5 illustrates a second embodiment of a water pump of an internal combustion engine according to the present invention, in which an end-face seal structure portion 28 similar to end-facer seal structure portion 24 is provided also on the inner peripheral side portion of seal lip 23 so that the entire outer surface of slinger main body 21 is covered by seal structure portion 22, on the basis of the configuration of the above-described first embodiment.

Therefore, in this embodiment, since slinger main body 21 made of metal is not exposed, occurrence of rust in slinger main body 21 can be prevented, and thus, contribution can be made to improvement of durability (corrosion resistance) of slinger 7.

Figure 6:
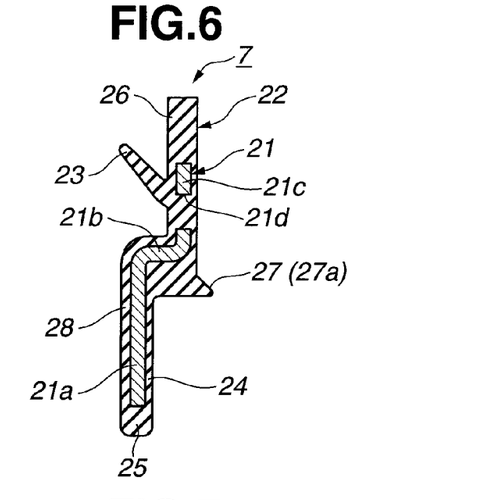
FIG. 6 is a longitudinal sectional view of a slinger (single body), showing a modified example of the second embodiment slinger of FIG. 5.
Figure 7:
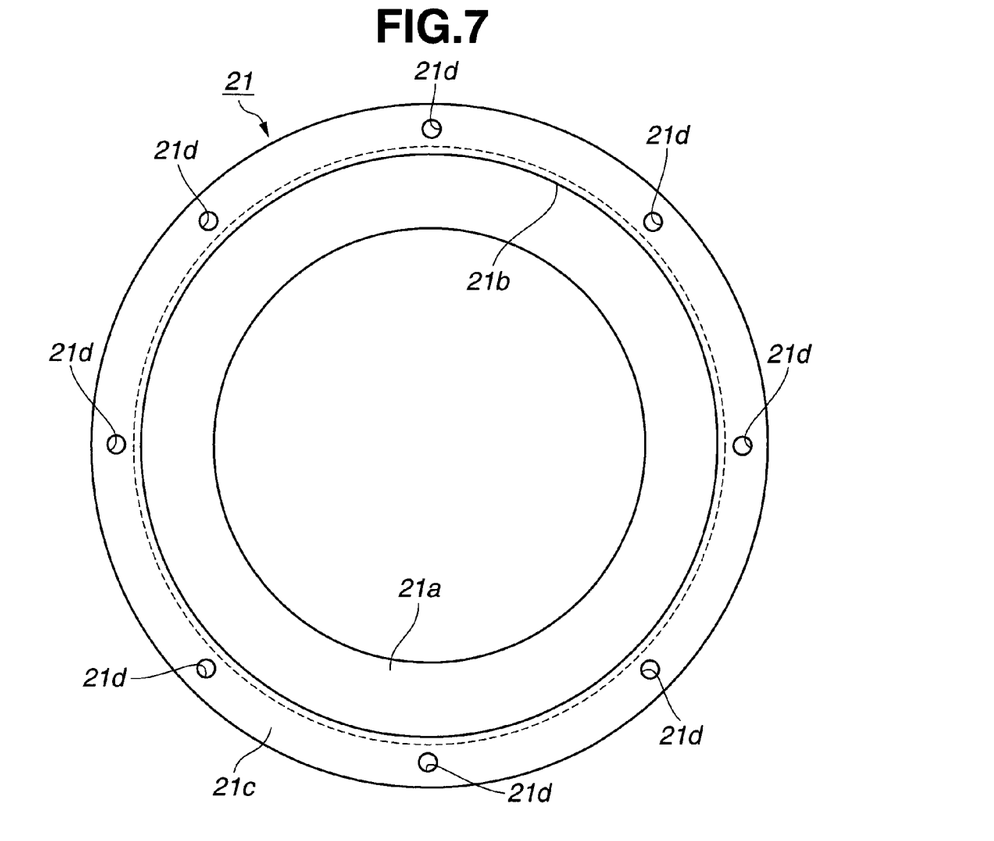
FIG. 7 is a plan view of a slinger main body of the slinger of FIG. 6.

FIGS. 6 and 7 illustrate a modified example of the water pump of an internal combustion engine according to the above-described second embodiment, and a connection form of seal structure portion 22 with slinger main body 21 is changed.

That is, in this modified example, a plurality of mounting holes 21d are formed piercing in the outer peripheral edge portion of slinger main body 21, and both end-face seal structure portions 24 and 28 are connected through each of mounting holes 21d.

As a result, in this modified example, seal structure portion 22 can be fixed to slinger main body 21 more firmly, and therefore inconvenience such as separation caused by deterioration of seal structure portion 22 can be suppressed.

The present invention is not limited to the configuration of each of the above-described embodiments, so that the shape of slinger main body 21 in slinger 7, mounting means and a range of seal structure portion 22, the shape of seal lip 23 and the like can be freely changed in accordance with specifications and the like of a pump and a vehicle on which the pump is to be mounted.

Moreover, it is sufficient that seal structure portion 22 is interposed between the slinger main body and stepped portion 11d in view of the gist of the present invention, and the seal structure portion 22 is not limited to a mode where it is bonded to slinger main body 21 as in each of the above-described embodiments. That is, any mode such as a mode in which the outer surface of slinger main body 21 is coated with a certain elastic member, a mode in which an elastic body corresponding to seal structure portion 22 is merely interposed between slinger main body 21 and stepped portion 11d and the like without being connected to slinger main body 21 can be employed, for example. In any case, the sealing effect similar to each of the above-described embodiments can be obtained.

Moreover, a certain amount of grease may be filled in a space portion SP formed on the radially inward side of seal lip 23 in each of the above-described embodiments, and in this case, passage suppression of rain water and the like through the fourth seal portion S4 can be assisted by the grease, and frictional durability (abrasion resistance) of seal lip 23 can be also improved by the grease.

As appreciated from above, according to the present invention, by sandwiching and fixing the shielding member so that the end-face seal structure portion is compressed and (elastically) deformed, even if a distance between sandwiching portions is increased as a result of a difference in a coefficient of linear expansion between the pump housing and the bearing (inner race), the increase of the distance between the of the sandwiching portions can be absorbed by elasticity (recovering deformation) of the end-face seal structure portion. As a result, even if the distance of the sandwiching portions is increased as a result of the difference in the coefficient of linear expansion, the both side portions (opposite surfaces) of the shielding member can be held in close contact with the stepped portion and the inner race of the bearing, and intrusion of moisture or the like from the inner peripheral side of the shielding member can be suppressed.

Hereinafter, technical ideas grasped from the above-described embodiments will be discussed.

(a) A water pump of an internal combustion engine, characterized by comprising:

a driving device including a pulley rotating by transmission of power from a driving source, a drive shaft rotating together with the pulley, and an impeller provided on the drive shaft to rotate together with the drive shaft;

a pump housing including a pump chamber structure portion defining at least a part of a pump chamber in which the impeller is disposed, a cylindrical portion constructed so as to surround an outer peripheral side of the drive shaft, the pump chamber structure portion and the cylindrical portion being integrally formed of an aluminum-based metal material, and a stepped portion provided on the outer peripheral side of the cylindrical portion;

a bearing including an outer race fixed to the pulley, an inner race made of an iron-based metal material and fixed to an outer periphery of the cylindrical portion, and a rolling body interposed between the inner race and the outer race; and a shielding member having an inner peripheral side sandwiched and fixed between the inner race and the stepped portion, and an outer peripheral side having a plate shape and extending to side of the outer race, and an end-face seal structure portion formed of an elastic material and on at least one of opposite surfaces of the sandwiched inner peripheral side.

(b) The water pump of the internal combustion engine described in the above-described (a), in that an inner peripheral surface seal structure portion made of an elastic material configured so as to be in elastic contact with an outer peripheral surface of the cylindrical portion is provided on an inner peripheral side of the shielding member.

By configuring as above, since the shielding member can be brought into close contact with the outer peripheral surface of the cylindrical portion through the inner peripheral surface seal structure portion, even if the outer diameter of the cylindrical portion is reduced due to the difference in the coefficient of linear expansion between the pump housing and the bearing (inner race), intrusion of rain water and the like from the inner peripheral side of the shielding member can be suppressed more reliably.

Moreover, since movement of the shielding member (particularly, the movement in the radial direction) can be also regulated by the elasticity of the inner peripheral surface seal structure portion, the mounting position of the shielding member is maintained as appropriate, and as a result, the shielding effect of rain water and the like by the shielding member can be exerted sufficiently.

(c) The water pump of the internal combustion engine described in the above-described (b), characterized in that a corner portion of the stepped portion is configured to have an arc-shaped section by connecting two faces with a continuous curved surface.

By configuring as above, the inner peripheral surface seal structure portion is brought into close contact with the arc-shaped corner portion, whereby a sealing effect by the inner peripheral surface structure portion is improved.

(d) The water pump of the internal combustion engine described in the above-described (b), characterized in that the end-face seal structure portion and the inner peripheral surface seal structure portion are integrally and continuously formed.

As described above, by integrally and continuously molding the both seal structure portions, favorable molding performance of the shielding member can be obtained, and productivity can be improved.

(e) The water pump of the internal combustion engine described in the above-described (d), characterized in that the end-face seal structure portion and the inner peripheral surface seal structure portion are integrally and continuously formed on an end portion on the pump housing side.

By configuring as above, a seal area can be allowed, and the shielding effect of rain water and the like by the shielding member can be further improved.

(f) The water pump of the internal combustion engine described in the above-described (d), characterized in that a seal lip is provided on a surface opposite to the outer race in the shielding member; and the seal lip and the end-face seal structure portion are integrally and continuously formed.

By configuring as above, favorable molding performance of the shielding member can be obtained, and productivity can be improved.

(g) The water pump of the internal combustion engine described in the above-described (f), characterized in that the end-face seal structure portion and the seal lip are integrally and continuously provided on the end portion on the pump housing side.

(h) The water pump of the internal combustion engine described in the above-described (g), characterized in that the end face seal structure portion is not formed on the end face on the seal lip side in the shielding member and on the inner peripheral side from the seal lip.

By configuring as above, since one end of the shielding member can be directly supported by the inner race made of metal, mounting rigidity of the shielding member can be improved, whereby sufficient compression (elastic) deformation of the end-face seal structure portion and favorable absorption of an increase of a distance of the sandwiching portions by the end-face seal structure portion on the basis of that are improved.

(i) The water pump of the internal combustion engine described in the above-described (g), characterized in that the shielding member has a stepped portion for separating the outer peripheral side portion in the axial direction with respect to the bearing on the outer peripheral side from the sandwiched portion; and a projection projecting in the axial direction of the cylindrical portion is formed on the side opposite to the bearing on the stepped portion.

By configuring as above, the intrusion suppressing effect of rain water and the like acting on the shielding member can be further improved by the projection.

(j) The water pump of the internal combustion engine described in the above-described (a), characterized in that the elastic material is a rubber material.

(k) The water pump of the internal combustion engine described in the above-described (a), characterized in that a bearing seal fixed to the inner race side and having an annular seal portion sliding with the outer race is provided.

By configuring as above, intrusion of rain water and the like into the bearing can be suppressed further appropriately and the bearing seal is used for the most direct waterproof for the bearing.

(l) The water pump of the internal combustion engine described in the above-described (k), characterized in that a seal lip is provided on a surface opposite to the outer race in the shielding member; and a lubricant oil is sealed in a space portion formed between the seal lip and the bearing seal.

By configuring as above, durability of particularly the seal lip can be improved.

(m) The water pump of the internal combustion engine described in the above-described (l), characterized in that a lubricant oil is sealed between the inner race and the outer race.

By configuring as above, lubrication and antirust in the bearing can be improved.

(n) The water pump of the internal combustion engine described in the above-described (a), characterized in that a mechanical seal for suppressing leakage of cooling water from the pump chamber is provided between the inner peripheral surface on the pump chamber structure portion side from the stepped portion in the cylindrical portion and the outer peripheral surface of the drive shaft; and a through hole penetrating the inner and outer peripheries is formed on the stepped portion side from the mechanical seal in the cylindrical portion.

By configuring as above, not only that leakage of the cooling water from the pump chamber can be suppressed by the mechanical seal but also the cooling water that could not be fully suppressed by the mechanical seal can be discharged to the outside through the through hole, and inconvenience that the cooling water relating to the leakage acts on the bearing through the inside of the pump housing can be avoided.

(o) The water pump of the internal combustion engine described in the above-described (n), characterized in that the through hole is opened and formed toward the upper side in the vertical direction.

By configuring as above, the cooling water (water vapor) having intruded over the mechanical seal into the pump housing can be efficiently discharged to the outside.

(p) The water pump of the internal combustion engine described in the above-described (a), characterized in that the inner race and the outer race are respectively fixed to cylindrical portion and the pulley by press-fitting.

The entire contents of Japanese Patent Application P2011-228445, filed Oct. 18, 2011, are incorporated herein by reference.

Although the invention has been described above by reference to certain embodiments and examples of the invention, the invention is not limited to the embodiments and examples described above. Modifications and variations of the embodiments and examples described above will occur to those skilled in the art, in light of the above teachings. The scope of the invention is defined with reference to the following claims.

What is claimed is:

1. A water pump of an internal combustion engine, comprising:
a driving device including a pulley rotating by transmission of power from a driving source, a drive shaft rotating together with the pulley, and an impeller provided on the drive shaft to rotate together with the drive shaft;
a pump housing including a pump chamber structure portion defining at least a part of a pump chamber in which the impeller is disposed, a cylindrical portion constructed so as to surround an outer peripheral side of the drive shaft, the pump chamber structure portion and the cylindrical portion being integrally formed of an aluminum-based metal material, and the cylindrical portion having portions with different outer diameter including a first diameter portion and a second diameter portion having an outer diameter that is larger than an outer diameter of the first diameter portion so as to form a stepped portion provided on an outer peripheral side of the cylindrical portion;
a bearing including an outer race fixed to the pulley, an inner race made of an iron-based metal material and fixed to an outer periphery of the first diameter portion, and a rolling body interposed between the inner race and the outer race; and
a shielding member having an inner peripheral portion sandwiched and fixed between the inner race and the stepped portion, an outer peripheral portion having a plate shape and extending to a side of the outer race, and an end-face seal structure portion formed of an elastic material and formed on one of the opposite surfaces of the sandwiched inner peripheral portion which is on a side of the stepped portion; and
the shielding member comprising an annular projection that extends along the outer peripheral surface of the second diameter portion, the annular projection preventing water from entering into a gap formed in a radial direction between the annular projection and the outer peripheral surface of second diameter portion, wherein
the shielding member includes an inner peripheral surface seal structure portion made of an elastic material, configured so as to be in elastic contact with an outer peripheral surface of the cylindrical portion, and provided on an inner peripheral side of the shielding member.

2. A water pump of an internal combustion engine, comprising:
a driving device including a pulley, a drive shaft rotating together with the pulley, and an impeller rotate together with the drive shaft;
a pump housing including a pump chamber structure portion defining at least a part of a pump chamber in which the impeller is disposed, a cylindrical portion constructed so as to surround an outer peripheral side of the drive shaft, the pump chamber structure portion and the cylindrical portion being integrally formed with each other, and the cylindrical portion having portions with different outer diameter including a first diameter portion and a second diameter portion having an outer diameter that is larger than an outer diameter of the first diameter portion so as to form a stepped portion provided on an outer peripheral side of the cylindrical portion;
a bearing including an outer race fixed to the pulley, an inner race fixed to an outer periphery of the cylindrical portion and made of a material having a coefficient of linear expansion smaller than the material of the pump housing, and a rolling body interposed between the inner race and the outer race; and
a shielding member having an inner peripheral portion sandwiched and fixed between the inner race and the stepped portion, and an outer peripheral portion having a plate shape and extending to a side of the outer race, in which one of the opposite surfaces of the sandwiched inner peripheral portion which is on a side of the stepped portion is coated with an elastic material;
the shielding member comprising an annular projection that extends along the outer peripheral surface of the second diameter portion, the annular projection preventing water from entering into a gap formed in a radial direction between the annular projection and the outer peripheral surface of second diameter portion, wherein the shielding member includes a seal lip which is provided on the outer peripheral portion of the shielding member, and which includes a tip end portion abutted on one end surface of the outer race in an axial direction of the drive shaft through an annular gap formed between one end surface of the outer peripheral portion of the shielding member and the outer race, and the shielding member includes an inner peripheral surface coated with an elastic material, and configured so as to be in elastic contact with an outer peripheral surface of the cylindrical portion.

3. A water pump of an internal combustion engine, comprising:

a driving device including a pulley, a drive shaft rotating together with the pulley, and an impeller;

a pump housing including a pump chamber structure portion defining at least a part of a pump chamber in which the impeller is disposed, a cylindrical portion constructed so as to surround an outer peripheral side of the drive shaft, the pump chamber structure portion and the cylindrical portion being integrally formed of an aluminum-based metal material, and the cylindrical portion having portions with different outer diameter including a first diameter portion and a second diameter portion having an outer diameter that is larger than an outer diameter of the first diameter portion so as to form a stepped portion provided on an outer peripheral side of the cylindrical portion;

a bearing including an outer race fixed to the pulley, an inner race made of an iron-based metal material and fixed to an outer periphery of the cylindrical portion, and a rolling body interposed between the inner race and the outer race; and a shielding member having an inner peripheral portion sandwiched and fixed between the inner race and the stepped portion, and an outer peripheral portion having a plate shape and extending to a side of the outer race;

the shielding member comprising an annular projection that extends along the outer peripheral surface of the second diameter portion, the annular projection preventing water from entering into a gap formed in a radial direction between the annular projection and the outer peripheral surface of second diameter portion, wherein an elastic body is interposed between one of the opposite surfaces of the sandwiched inner peripheral portion of the shielding member which is on the stepped portion and the stepped portion of the pump housing, the shielding member includes a seal lip which is provided on the outer peripheral portion of the shielding member, and which includes a tip end portion abutted on one end surface of the outer race in an axial direction of the drive shaft through an annular gap formed between one end surface of the outer peripheral portion of the shielding member and the outer race, and the shielding member includes an inner peripheral surface seal structure portion made of an elastic material, configured so as to be in elastic contact with an outer peripheral surface of the cylindrical portion, and provided on an inner peripheral side of the shielding member.

4. A water pump of an internal combustion engine as claimed in claim 1, wherein a corner portion of the stepped portion is configured to have an arc-shaped section by connecting two faces with a continuous curved surface.

5. A water pump of an internal combustion engine as claimed in claim 1, wherein the end-face seal structure portion and the inner peripheral surface seal structure portion are integrally and continuously formed.

6. A water pump of an internal combustion engine as claimed in claim 5, wherein the end-face seal structure portion and the inner peripheral surface seal structure portion are integrally and continuously formed on an end portion of the shielding member on a pump housing side.

7. A water pump of an internal combustion engine as claimed in claim 5, wherein a seal lip is provided on a surface opposite to the outer race in the shielding member; and the seal lip and the end-face seal structure portion are integrally and continuously formed.

8. A water pump of an internal combustion engine as claimed in claim 7, wherein the end-face seal structure portion and the seal lip are integrally and continuously provided on the end portion of the shielding member on a pump housing side.

9. A water pump of an internal combustion engine as claimed in claim 8, wherein the end face seal structure portion is not formed on the same side of the shielding member as the seal lip, on the inner peripheral side of the seal lip.

10. A water pump of an internal combustion engine as claimed in claim 8, wherein the shielding member has a stepped portion for separating the outer peripheral side portion in the axial direction with respect to the bearing on the outer peripheral side from the sandwiched portion; and a projection projecting in the axial direction of the cylindrical portion is formed on the side opposite to the bearing on the stepped portion.

11. A water pump of an internal combustion engine as claimed in claim 1, wherein the elastic material is a rubber material.

12. A water pump of an internal combustion engine as claimed in claim 1, wherein a bearing seal fixed to the inner race side and having an annular seal portion sliding with the outer race is provided.

13. A water pump of an internal combustion engine as claimed in claim 12, wherein a seal lip is provided on a surface opposite to the outer race in the shielding member; and a lubricant oil is sealed in a space portion formed between the seal lip and the bearing seal.

14. A water pump of an internal combustion engine as claimed in claim 13, wherein a lubricant oil is sealed between the inner race and the outer race.

15. A water pump of an internal combustion engine as claimed in claim 1, wherein a mechanical seal for suppressing leakage of cooling water from the pump chamber is provided between the inner peripheral surface on the pump chamber structure portion side from the stepped portion in the cylindrical portion and the outer peripheral surface of the drive shaft; and a drain hole penetrating the inner and outer peripheries is formed on the stepped portion side from the mechanical seal in the cylindrical portion.

16. A water pump of an internal combustion engine as claimed in claim 15, wherein the drain hole is opened and formed toward the upper side in the vertical direction.

17. A water pump of an internal combustion engine as claimed in claim 1, wherein the inner race and the outer race are respectively fixed to cylindrical portion and the pulley by press-fitting.

* * * * *